Jan. 17, 1967    W. J. ARVAY ETAL    3,298,822
METHOD OF MAKING SLAG-BASED SOIL TREATMENT COMPOSITION
COMPRISING PLANT-AVAILABLE PHOSPHORUS VALUES
Filed Sept. 24, 1963
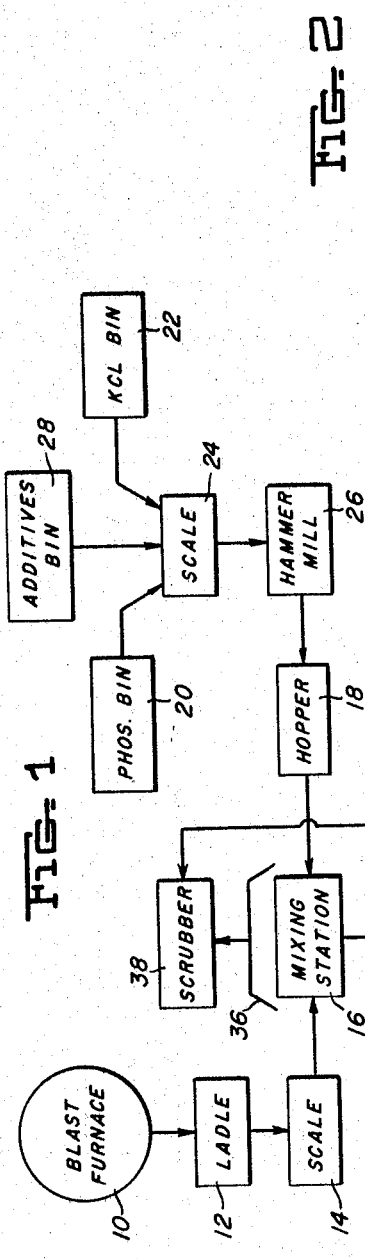
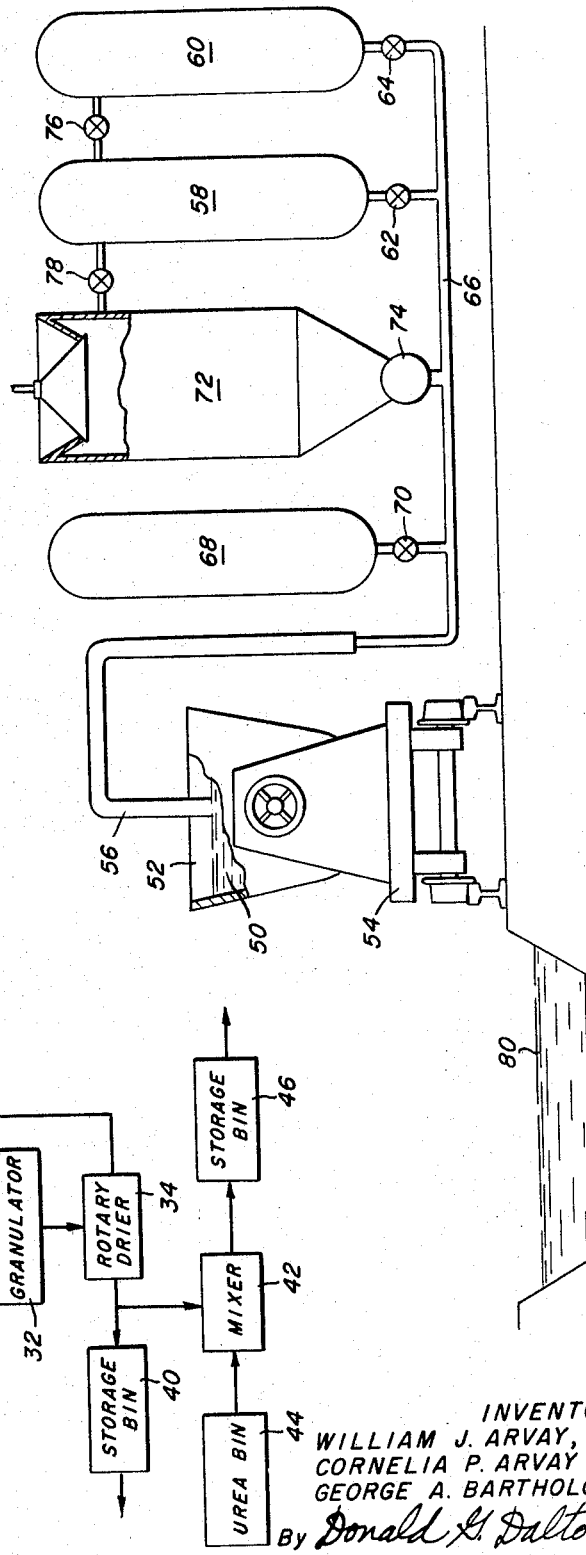
INVENTORS
WILLIAM J. ARVAY,
CORNELIA P. ARVAY and
GEORGE A. BARTHOLOMEW
By Donald G. Dalton
Attorney United States Patent Office 3,298,822
Patented Jan. 17, 1967

3,298,822
METHOD OF MAKING SLAG-BASED SOIL TREATMENT COMPOSITION COMPRISING PLANT-AVAILABLE PHOSPHORUS VALUES
William J. Arvay and Cornelia P. Arvay, Mount Lebanon, Pa. (both of 1012 Larchdale Drive, Pittsburgh, Pa. 15216), and George A. Bartholomew, 122 Yorkshire Road, Pittsburgh, Pa. 15208
Filed Sept. 24, 1963, Ser. No. 311,148
6 Claims. (Cl. 71—33)

This invention relates to a soil treatment composition and to a method of making the same and more particularly to a soil treatment composition which includes metallurgical slag and plant available phosphorus compounds and to a method of making the same.

Soil treatment compositions are utilized as plant nutrients, liming agents and soil conditioners. Plant nutrients which are generally referred to as fertilizers include nitrogen, phosphorus and potassium in those chemical forms which render them readily available to the plants. These constituents, because of their use in large amounts by the soil, are categorized as primary plant nutrients. They may be separately applied or may be intermixed in appropriate proportions to be applied to the soil as single application plant nutrients. Even when intermixed, the fertilizers do not usually contain secondary and trace nutrients. Liming agents control the acidity of the soil. Conventional liming agents are not normally included in fertilizer mixes and, therefore, require separate individual application. Certain types of soil require the periodic application of soil conditioners to provide aeration, increase moisture retention, and promote root permeation and growth. Sand, vermiculite, peat moss and slag are utilized for this purpose. These soil conditioners, with the exception of metallurgical slag, have little, if any, liming or alkalizing ability. The soil conditioners do not have any substantial chemical effect on the soil and do not serve as plant nutrients. The soil conditioners are usually applied separately. To treat the soil completely with a plant nutrient, a liming agent and a soil conditioner requires separate application of each composition. To the best of our knowledge there is not presently available a single application, multiple purpose product capable of performing all three necessary soil preparation functions.

We have discovered that by mixing metallurgical slag and other mineral constituents in a molten state and thereafter rapidly quenching the mixture we obtain a product that can be mixed with other plant nutrients in a dry, granular state to provide a soil treatment composition that is capable of performing all three necessary soil preparation functions. The constituents can be mixed with molten slag as it is, for example, discharged from a blast furnace; or, alternatively, solidified slag can be mixed with the constituents before melting and the mixture thereafter brought to a molten state.

One of the problems encountered in preparing such a soil treatment composition is the conversion of insoluble rock phosphate to forms of soluble phosphorus which are more readily available to plants as a plant nutrient. Conventionally, the phosphate rock is treated with strong acids to convert the phosphates to a plant available form of phosphorus. This type of conversion is costly and involves substantial initial capital investment for a plant and equipment. A number of processes have been devised to decompose thermally the complex phosphates in phosphate rock by fusing the phosphate rock with an alkali or an acid. These processes are expensive in that substantial heat must be applied to the phosphate rock to thermally decompose the same.

It has been suggested to add phosphate rock to molten slag and thereby enrich the slag in a phosphorus plant nutrient. This is disclosed in Fitterer Patent No. 2,471,-562, dated May 31, 1949. However, when phosphate rock is added in the manner taught in this patent there is little conversion of the phosphate rock to plant available phosphorus. We have discovered, surprisingly, that the efficiency of conversion of phosphate rock to plant available phosphorus is dependent on many parameters such as the cooling rate of the mixture of molten slag and phosphate rock, the temperature of the molten slag, the ratio of slag and rock in the mixture, and the use of additives to increase the conversion of the phosphates to plant available form.

Throughout this specification the term "plant available phosphorus" is intended to designate forms of phosphorus which are soluble either in neutral ammonium citrate solution or soluble in water.

Briefly, our invention includes a process for mixing metallurgical slag with phosphate rock under certain conditions to form a homogeneous melt and convert a substantial amount of the phosphates to soluble plant available form. The slag-phosphate rock melt is granulated and may be mixed with other plant nutrients to provide a soil treatment composition that functions as a fertilizer, a liming or alkalizing agent, and a physical soil conditioner. Thus, a single application of our composition to the soil provides all the necessary soil preparation functions. The slag granules serve as physical soil conditioners, the lime and magnesia in the slag serve as liming or alkalizing agents, and the converted phosphates in the homogeneous melt and other plant nutrients serve as a fertilizer.

One of the primary features of our invention is the process for converting the insoluble phosphates in the phosphate rock to soluble plant available phosphorus by mixing predetermined portions of phosphate rock, molten metallurgical slag and other additives at given temperatures to obtain a product having a high content of soluble plant available phosphorus.

It is, therefore, a principal object of our invention to provide a soil treatment composition that includes slag, preferably metallurgical slag, and a substantial amount of plant available soluble phosphorus.

Another object of our invention is to provide a process for converting phosphate rock to plant available phosphorus by mixing the phosphate rock with molten metallurgical slag and thereafter rapidly cooling the mixture.

Still another object of our invention is to increase the efficiency of conversion of the insoluble phosphates in phosphate rock to soluble plant available phosphorus by adding other constituents to the molten slag with the phosphate rock.

Another object of our invention is to provide a soil treatment composition that contains primary, secondary and trace plant nutrients, a liming agent and a soil conditioner which may be applied as a single application to the soil to provide all the necessary major functions of proper soil preparation.

These and other objects will be more apparent after referring to the following description and accompanying drawings, in which:

FIGURE 1 is a diagrammatic view of a suitable processing line for preparing our soil conditioner; and FIGURE 2 is a schematic view of apparatus used in the practice of our invention.

Referring more particularly to FIGURE 1 of the drawings, reference numeral 10 indicates a blast furnace from which molten slag is withdrawn and poured into a ladle 12. The amount of slag in the ladle 12 is determined by a suitable scale 14 while the molten slag is being transferred or conveyed to a mixing station 16. The slag is maintained in a molten state and at a predetermined temperature at the mixing station 16 by a suitable heating device, not shown. Adjacent to the mixing station 16 there is a hopper 18 which contains an inventory of phosphate rock and potassium chloride. A bin 20 is provided for the phosphate rock and a bin 22 for the potassium chloride. Predetermined quantities of phosphate rock and potassium chloride are withdrawn from bins 20 and 22 and are weighed on a scale 24. The materials are conveyed from the scale 24 to a suitable comminuting device such as hammer mill 26. The materials are mixed and comminuted in the hammer mill 26 and thereafter transferred to hopper 18. As more fully discussed hereinafter, additives which increase the efficiency of conversion of the insoluble phosphates in the phosphate rock to plant available phosphorus, preferably are added in predetermined quantities to the mixture of phosphate rock and potassium chloride. These additives are $K_2CO_3$, $K_2SO_4$, KCl and $CaCO_3$. A separate bin 28 is provided for the additives.

The mixture of potassium chloride and phosphate rock is mixed with the molten slag in ladle 12 at mixing station 16 to form a homogeneous melt. The mixture is maintained at a temperature of about 2650° F. for a predetermined time of at least two minutes and is then rapidly cooled by air quenching or by water quenching in a granulator 32 where the material is comminuted to a predetermined size. The comminuted material is conveyed from the granulator 32 to a conventional rotary drier 34.

A hood 36 is positioned over the mixing station 16 and is arranged to collect the rydrogen fluoride gas and the dust evolved during the mixing of the molten slag, phosphate rock and potassium chloride. A scrubber 38 removes the dust and gases evolved at the mixing station 16 and in the drier 34.

From the rotary drier 34 the material can be stored in a bin 40 for shipment as a soil treatment composition containing primary nutrients of plants available phosphorus and potassium, and secondary and trace nutrients. If a soil treatment composition containing a nitrogen nutrient is desired, the material from drier 34 can be transferred to a mixer 42 and a predetermined amount of suitable nitrogenous fertilizer mixed therewith. A bin 44 is provided for a supply of urea or other nitrogenous material which may be mixed with the soil treatment composition in mixer 42. The soil treatment composition containing phosphorus, potassium and nitrogen plant nutrients is stored in bin 46 for shipment.

It will be readily apparent if a soil treatment composition containing only plant available phosphorus is desired, the potassium chloride would be omitted from the mixture fed to the molten slag at the mixing station 16.

Typical formulations that may be obtained by our process are set forth below and are intended to be exemplary only. These formulations do not enumerate the secondary and trace nutrients available in our soil treatment composition. It is assumed in these formulations that 28.3% of the rock phosphate (88.5% of the 32% $P_2O_5$ contained in the rock phosphate) is converted to plant available phosphorus. Furthermore, the weight of the potassium chloride should be less than 75% of the weight of the rock phosphate.

*Basic materials*

Rock phosphate=$Ca_3(PO_4)_2$
    Normal $P_2O_5$ Contained=32%
    Normal $P_2O_5$ availability=3%
    In slag $P_2O_5$ availability=28.3%
Muriate of potash=KCl
    Normal $K_2O$ availability=60%
    In slag $K_2O$ availability=60%

(Varies with firing time—here 60% used for calculations)
Slag—CaO, $SiO_2$, $Al_2O_3$, MgO-$CaCO_3$ equivalent=80%
Urea—Nitrogen availability=45%
Ureaform—Nitrogen availability=38%

Other nitrogenous materials such as $(NH_3)_2SO_4$ at 21% availability and $NH_3NO_3$ at 33% availability may also be utilized. By dissolving 707 lbs. of $Ca_3(PO_4)_2$ and 334 lbs. of KCl in 959 lbs. of molten slag and maintaining the mixture molten for a period of about 30 minutes, a formulation is obtained which contains 10% $P_2O_5$ and 10% $K_2O$ and which has a $CaCO_3$ equivalent of 863 lbs.

By dissolving 353 lbs. of $Ca_3(PO_4)_2$ and 167 lbs. of KCl in 1935 lbs. of molten slag and maintaining the mixture molten for a period of about 30 minutes and quenching the resultant product and mixing the quenched product with 445 lbs. of urea (45% N) a formulation is obtained which contains 10% N, 5% $P_2O_5$ and 5% $K_2O$ and which has a $CaCO_3$ equivalent of 931 lbs.

A formulation similar to that in the preceding paragraph may be obtained by dissolving the $Ca_3(PO_4)_2$ and KCl in 986 lbs. of slag in the same manner as above but mixing the resulting quenched product with 178 lbs. of urea and 316 lbs. of ureaform (38% N) to obtain 2,000 lbs. of fertilizer. In this formulation, 4% N is derived from quick-acting urea and 6% N is furnished as slower release ureaform. This mixture provides a lower $CaCO_3$ equivalent of 887 lbs.

In another specific embodiment of our invention 22.25% phosphate rock and 16.7% KCl are added to 61.05% molten slag, all percentages being by weight of the entire mixture. The mixture is maintained at a temperature of 2650° C. for 20 minutes and then rapidly air quenched. This provides a soil treatment composition having approximately 10% available phosphorus and 10% available potassium, sufficient lime for normal requirements and which is in granular form so as to provide the best physical soil conditioning characteristics. Nitrogen may be added in any suitable manner as by mixing a desired amount of urea with the dry granules. It will be seen that the weight of the KCl is 75% of the weight of the rock phosphate. The method may be successfully used when adding between 16 and 68.8% of the rock phosphate and between 12 and 50.1% of KCl to molten slag. We have found several surpising variables that have a surprising effect on the conversion of insoluble phosphates to soluble plant available phosphates. The phosphates in phosphate rock will be expressed as insoluble $P_2O_5$ and the $P_2O_5$ that is converted to citrate soluble and water soluble $P_2O_5$ will be indicated as available $P_2O_5$. The available $P_2O_5$ indicates the total $P_2O_5$ in the mixture that is in a plant available form. The efficency of conversion of insoluble $P_2O_5$ in phosphate rock to soluble plant available phosphate is expressed as follows:

$$\text{efficiency, percent} = \frac{\text{Available } P_2O_5}{\text{Total } P_2O_5} \times 100$$

We have found the manner in which the homogeneous mixture is cooled has a significant effect on the efficiency of conversion. Table I clearly illustrates that rapid cooling as compared with slow cooling has a substantial effect on the efficiency of conversion. The term "firing time" is intended to indicate the period of time the mixture was maintained at the elevated temperature indicated.

TABLE I

| S/PR | Firing | | $P_2O_5$ Content Total | Percent of Mixture Available | Efficiency of Conversion |
|---|---|---|---|---|---|
| | Time, min. | Temp., °F. | | | |
| Rapid Cool | 30 | 2,520 | 9.85 | 1.19 | 12.1 |
| Slow Cool | 30 | 2,520 | 9.17 | 0.67 | 7.3 |

The table illustrates that the efficiency of conversion of insoluble phosphates to soluble plant available phosphorus is almost twice as high for the rapidly cooled sample as for the slow cooled sample.

The tests of Table I were conducted by melting a sample mixture of slag and phosphate rock in a furnace without any additives. The fast cool was obtained by taking the sample out of the furnace and letting it cool in air, this requiring about five minutes. The slow cool was obtained by letting the sample remain in the furnace after the heat was shut off. This required about one day.

We have also found the ratio of slag to the phosphate rock in the mixture has a significant effect on the efficiency of conversion. Table II illustrates the efficiency of conversion at two ratios of slag to phosphate rock, the first at equal parts by weight of slag and phosphate rock and the second at two parts of slag to one part phosphate rock.

TABLE II

| S/PR | Firing | | $P_2O_5$ Content Total | Percent of Mixture Available | Efficiency of Conversion |
|---|---|---|---|---|---|
| | Time, min. | Temp., °F. | | | |
| 1:1 | 30 | 2,650 | 15.49 | 1.55 | 10% |
| 2:1 | 30 | 2,650 | 10.65 | 5.43 | 51% |

The firing temperature, that is, the elevated temperature at which the mixture of slag and phosphate rock is maintained for a preselected time, in this instance thirty minutes, also significantly affected the efficiency of conversion. From Table III it will be seen that the maximum efficiency of conversion is obtained at temperatures above about 2600° F.

TABLE III

| S/PR * | Firing | | $P_2O_5$ Content Total | Percent of Mixture Available | Efficiency of Conversion |
|---|---|---|---|---|---|
| | Time, min. | Temp., °F. | | | |
| 2:1 | 30 | 2,520 | 9.85 | 1.19 | 12.1 |
| 2:1 | 30 | 2,600 | 9.96 | 1.90 | 19.1 |
| 2:1 | 30 | 2,650 | 10.65 | 5.43 | 51.0 |
| 2:1 | 30 | 2,700 | 10.58 | 4.68 | 44.3 |
| 2:1 | 30 | 2,750 | 10.75 | 4.05 | 37.6 |

*S/PR = Ratio of slag to phosphate rock.

Several additives were mixed with molten slag and phosphate rock to increase the efficiency of conversion of phosphorus to a soluble plant available form. Surprisingly, it was found that $CaCO_3$ increased the efficiency substantially. The $K_2CO_3$ additive was also beneficial whereas $SiO_2$ resulted in a lower efficiency. Table IV illustrates the effect of the various additives with calcium carbonate expressed as calcium oxide and $K_2CO_3$ expressed as potassium oxide. The melts were maintained at a temperature of 2650° F. for a period of thirty minutes. Where certain additives are mixed with equal parts of molten slag and phosphate rock, the efficiency of conversion is increased substantially when compared with similar mixtures not containing the additives.

TABLE IV

| S/PR | Additives | | $P_2O_5$ Content Total | Percent of Mixture Available | Efficiency of Conversion |
|---|---|---|---|---|---|
| | Oxide | Amount, % | | | |
| 2:1 | None | | 10.65 | 5.43 | 51.0 |
| 2:1 | CaO | 5 | 9.94 | 6.97 | 70.2 |
| 2:1 | CaO | 10 | 9.60 | 7.39 | 77.0 |
| 2:1 | CaO | 15 | 9.20 | 7.92 | 86.0 |
| 2:1 | $K_2O$ | 10 | 10.27 | 7.53 | 73.3 |
| 2:1 | $SiO_2$ | 10 | 9.55 | 0.88 | 9.2 |
| 1:1 | None | | 15.49 | 1.55 | 10 |
| 1:1 | CaO | 10 | 14.40 | 7.83 | 54.4 |
| 1:1 | CaO | 15 | 14.10 | 10.90 | 77.3 |
| 1:1 | $K_2O$ | 10 | 15.07 | 12.29 | 81.5 |
| 1:1 | $CaO/K_2O$ | 10/5 | 14.43 | 12.78 | 88.5 |

The percentages are indicated by weight of the total mixture.

The period of time the mixture of slag and phosphate rock was maintained at an elevated temperature also had a significant effect on the efficiency of conversion. The efficiency of conversion for various periods of time is set fourth below in Table V.

TABLE V

| S/PR | Firing | | $P_2O_5$ Content Total | Percent of Mixture Available | Efficiency of Conversion |
|---|---|---|---|---|---|
| | Time, min. | Temp., °F. | | | |
| 2:1 | 2.5 | 2,650 | 9.77 | 7.26 | 74.2 |
| 2:1 | 5 | 2,650 | 9.71 | 7.62 | 78.5 |
| 2:1 | 10 | 2,650 | 9.80 | 7.90 | 80.7 |
| 2:1 | 20 | 2,650 | 9.78 | 7.80 | 79.8 |
| 2:1 | 30 | 2,650 | 9.74 | 7.84 | 80.5 |
| 2:1 | 40 | 2,650 | 9.20 | 7.85 | 85.3 |

With the herein described process it is now possible to produce various fertilizer bases containing plant available phosphorus to which nitrogen bearing and potassium bearing compounds can be added to produce a complete line of fertilizers. The potassium can be added to the melt so that the grannules will contain both the phosphorus and potassium nutrients.

It will be readily apparent by adding phosphorus, potassium and nitrogent as previously described that our soil treatment composition would contain not only the primary nutrients but also the secondary nutrients and a substantial number of the trace nutrients required for proper plant growth. In addition, our soil treatment composition functions as a limiting agent and as a soil conditioner.

This slag treating method offers several significant processing advantages as well as a series of unique new products. Initially, the equipment involved is simple, inexpensive and essentially maintenance-free. The method provides safe, inexpensive, uniform introduction of mineral additives to molten slag, altering its composition, increasing its value and improving its uniformity. Additionally, it achieves the direct conversion of insoluble phosphates from low-grade rock into soluble phosphorus which break down easily and are readily available to plants. Hence, it permits the production of a complete series of homogeneous slag-based products, the most immediately useful of which are self-liming, soil conditioning, mineral fertilizers which, when intermixed with suitable nitrogen-containing materials, become complete, balanced, single-application fertilizers. Proper manipulation of the types of nitrogen mixtures further facilitate the regulation of nitrogen release and permits accurate compounding of controlled action fertilizers. Furthermore, soluble silicates in the slag complex tend to replace phosphatic materials in the iron and alminum-stabilized soil complex, thus increasing greatly the efficiency of phosphate fertilization.

Such products provide, in a single-application material, all three necessary soil preparation functions.

Another system for carrying out the process of the invention is shown in FIGURE 2. Molten slag 50 collected at the furnace in a ladle 52 is transported to the processing site in ladle car 54 and properly positioned beneath a vertically adjustable lance 56. Air or oxygen from pressurized storage tanks 58 and 60 is metered through control valves 62 and 64 into a feed line 66 where it combines and mixes with fuel from storage tank 68 metered through a control valve 70. This fuel-oxygen mixture flows through the feed line 66 into the lance 56 which is lowered vertically, thereby submerging its tip into the molten slag where the combustible mixture is ignited within the mass of the molten magma. As appropriate conditions of temperature and fluidity are achieved within the slag, finely divided additives from a bin 72 are introduced through control valve 74 into the feed line 66, are conveyed by the gaseous mixture to the lance 56 and are injected through the firey flame at the lance tip into the molten slag. The finely divided or granular additives may comprise any one or more of the additives mentioned above including crushed phosphate rock and a potassium compound, for the purpose of producing fertilizer. To facilitate controlled introduction of solid mineral powder into feed line 66, high pressure gas from storage tanks 58 and 60 is bled through valves 76 and 78 into bin 72 to equalize its pressure with that of the feed line 66.

Having effected the introduction and dissolution of the desired amount of mineral additive into the molten slag, the lance 56 is vertically withdrawn and the treated molten slag is poured from the ladle into a water-filled pit 80 where it is instantly quenched. The resulting material removed from the granulating pit 80 may be marketed directly or may be dried, ground and sized as desired for specific applications.

Should air-cooled crystalline products be desired, the pit 80 will be drained and the molten slag poured into the dry pit, allowed to cool slowly and solidify, and thereafter will be excavated by conventional means. Air-cooled products may be marketed directly as run-of-bank material, or may be dried, ground, sized and packaged as desired.

It will be apparent that the process described above in connection with FIGURE 2 does not rely solely upon the heat content of the slag magma, but supplies additional heat through the fuel-oxygen lance 56 to the molten mass. This additional heat maintains and increases the fluidity of the untreated slag and supplies sufficient sensible and latent heat to fully melt and react the additives. The gas-oxygen lance 56 is further utilized as an efficient injector of any of the additive materials mentioned above into the molten slag. That is, the powdered additives are controllably introduced into the gas stream in feed line 66 which conveys them into the body of the liquid slag and injects them, through a firey flame, into the molten solvent slag. By this method, the additive materials are introduced and dispersed into the hottest, most reactive portion of the magma. Coupled with the excellent mixing provided by the submerged lance, the technique provides ideal conditions for rapid, efficient production of truly homogeneous slag-based fertilizer products.

Although the present invention has been illustrated and described in connection with certain example formulations of the invention, it will be understood that those skilled in the art can make numerous formulation changes, additions, and variations to suit individual design preferences intended that such variations and changes come within the scope of the present invention and will be included within the terms of the following claims as equivalents of the invention.

We claim:

1. The method of converting insoluble phosphorus in phosphate rock to plant available phosphorus which comprises mixing the phosphate rock with molten metallurgical slag, and maintaining said mixture at a temperature of between 2600° F. and 2700° F. for a period of at least two minutes, and then rapidly cooling said mixture.

2. The method as set forth in claim 1 in which the metallurgical slag and phosphate rock are mixed in a ratio of about two parts by weight metallurgical slag to one part by weight phosphate rock.

3. The method of converting insoluble phosphorus in phosphate rock to plant available phosphates which comprises mixing the phosphate rock with molten metallurgical slag, and at least one compound selected from the group consisting of $K_2CO_3$, $KCl$, $K_2SO_4$ and $CaCO_3$ and maintaining said mixture at a temperature of between 2600° F. and 2700° F. for a period of at least two minutes, and then rapidly cooling said mixture.

4. The method of making a slag-based fertilizer which comprises adding rock phosphate and KCl to molten metallurgical slag with the weight of KCl being less than about 75% of the weight of the rock phosphate, maintaining the mixture molten for a period of at least two minutes to permit the ingredients thereof to react to form available phosphorus and available potassium, and then rapidly quenching said mixture to obtain the fertilizer in granular form.

5. The method of making a slag-based fertiziler which comprises adding a molten metallurgical slag between 16% and 66.8% of rock phosphate and between 12% and 50.1% of KCl, said percentages being by weight with the weight of KCl being less than 75% of the weight of rock phosphate, maintaining the mixture molten for a period of at least two minutes to permit the ingredients thereof to react to form available phosphorus and available potassium, and then rapidly quenching said mixture to obtain the fertilizer in granular form.

6. The method of making a slag-based soil treatment composition which comprises mixing together in a molten state metallurgical slag, phosphate rock, and at least one compound selected from the group consisting of $K_2CO_3$, KCl, $K_2SO_4$ and $CaCO_3$, the phosphate rock being between 16% and 68.8% by weight of the slag, maintaining said molten mixture for a period of at least two minutes, and then rapidly cooling said mixture.

References Cited by the Examiner

UNITED STATES PATENTS

| | | | |
|---|---|---|---|
| 1,338,734 | 5/1920 | Johnson | 71—62 |
| 1,937,039 | 11/1933 | Johnston et al. | 71—62 |
| 2,532,548 | 12/1950 | Heide | 71—31 |
| 2,533,142 | 12/1950 | Royster | 71—44 |
| 2,609,287 | 9/1952 | Hennenberger | 71—44 |
| 2,927,851 | 3/1960 | Wilson | 71—1 |
| 2,983,594 | 5/1961 | Jost | 71—1 |

FOREIGN PATENTS

| | | |
|---|---|---|
| 16,704 | 10/1934 | Australia. |
| 21,484 | 1899 | Great Britain. |
| 437,445 | 10/1935 | Great Britain. |
| 756,101 | 8/1956 | Great Britain. |

DONALL H. SYLVESTER, *Primary Examiner.*

ANTHONY SCIAMANNA, T. D. KILEY,
*Assistant Examiners.*